United States Patent [19]

Chowdhury

[11] Patent Number: 4,807,566
[45] Date of Patent: Feb. 28, 1989

[54] MILK CLAW

[75] Inventor: Mofazzal H. Chowdhury, Lenexa, Kans.

[73] Assignee: Alfa-Laval, Inc., Ft. Lee, N.J.

[21] Appl. No.: 104,154

[22] Filed: Oct. 5, 1987

[51] Int. Cl.⁴ .............................................. A01J 5/00
[52] U.S. Cl. ................................................ 119/14.55
[58] Field of Search ............... 119/14.55, 14.54, 14.08, 119/14.36, 14.37

[56] References Cited

U.S. PATENT DOCUMENTS

| 998,856 | 7/1911 | Mitchell | 119/14.55 |
| 2,702,526 | 2/1955 | Torgerson | 119/14.55 |
| 3,406,663 | 10/1968 | Duncan | 119/14.01 |
| 3,741,161 | 6/1973 | Zhuk et al. | 119/14.36 |
| 4,253,419 | 3/1981 | Yang | 119/14.54 |
| 4,365,589 | 12/1982 | Phillips et al. | 119/14.55 |
| 4,434,744 | 3/1984 | Millar | 119/14.54 X |
| 4,441,454 | 4/1984 | Happel et al. | 119/14.55 X |
| 4,537,152 | 8/1985 | Thompson | 119/14.54 |

FOREIGN PATENT DOCUMENTS

| 220055 | 3/1985 | Fed. Rep. of Germany | 119/14.08 |
| 197801 | 1/1978 | U.S.S.R. | 119/14.54 |
| 1160900 | 8/1969 | United Kingdom | 119/14.54 |

Primary Examiner—Robert P. Swiatek
Assistant Examiner—R. Thomas Price
Attorney, Agent, or Firm—Davis Hoxie Faithfull & Hapgood

[57] ABSTRACT

A milk claw is provided with a flow separator having vanes separating streams of milk from the individual quarters of a cow's udder in the upper part of the claw but permitting communication between said streams in the bottom of the claw.

2 Claims, 2 Drawing Sheets

MILK CLAW

This invention relates to a milk claw and in particular to a milk claw which is structured in a way to prevent cross-contamination without increasing vacuum fluctuation.

Milk claws are designed to receive milk from each of the four teat cups attached to the cow being milked, combine the streams from each of the teat cups and deliver them to a milk line for further processing. In the usual milk claw rubber tubes connect the teat cup to steel or plastic nipples on the top of the claw and the milk from each of these nipples flows into the bowl of the claw. On occasion milk from one nipple may be drawn up into an adjacent nipple. This can happen, for example, if a teat cup falls off the animal destroying the vacuum in the claw. In this way milk from one teat can reach another teat of the animal.

Mastitis is frequently experienced in cows. Normally when mastitis occurs it is limited to one quarter of the udder. However, if milk from an infected quarter reaches a non-infected quarter, as in the manner described, it can infect the hitherto non-infected quarter. Thus it is desirable to prevent milk from one quarter reaching another quarter through the milk claw.

This problem has been recognized and one solution which has been proposed is to divide the milk claw into four separate compartments with milk from each quarter of the udder being delivered to its own compartment and removed from the claw into the milk line through a restricted passage. Such devices are disclosed, for example, in U.S. Pat. Nos. 4,365,589 and 4,434,744. The difficulty with such systems is that the variation or swing in the vacuum inside each compartment of the milk claw corresponding to periods of milk flow and non-flow becomes very great. Wide swings in the vacuum are undesirable in causing turbulence and aeration of the milk.

In accordance with the present invention a milk claw is provided which prevents flow from one quarter to another and thus suppresses cross-contamination, without the disadvantage of wide swings in vacuum. According to the invention a milk claw comprises a bowl having a top and a bottom, inlet tubes for delivering milk from a lactating animal to the top of said bowl, an outlet for removing milk from the bottom of said bowl and a plurality of vanes or partitions extending from the top of the bowl toward the bottom but terminating above the bottom, said vanes being spaced from one another to separate the milk streams delivered from each of the inlets from milk delivered from the other inlets in the upper part of the bowl but permitting free communication between said streams in the bottom of the bowl.

Preferably the bowl of the claw is circular in cross-section and the inlet nipples join the claw in a tangential direction, as disclosed in Yang U.S. Pat. No. 4,253,419, to give the milk flowing into the claw a swirling motion. In this case the partitions are also given a twisted configuration, as flights of a helical screw, to promote the spiral flow. Preferably the inlet nipples are curved so that their outer ends point radially outwardly of the claw to avoid unnecessary flexing of the tubes joining the claw to the teat cup.

The invention will be further described with reference to the accompanying drawings in which.

Figure 1:
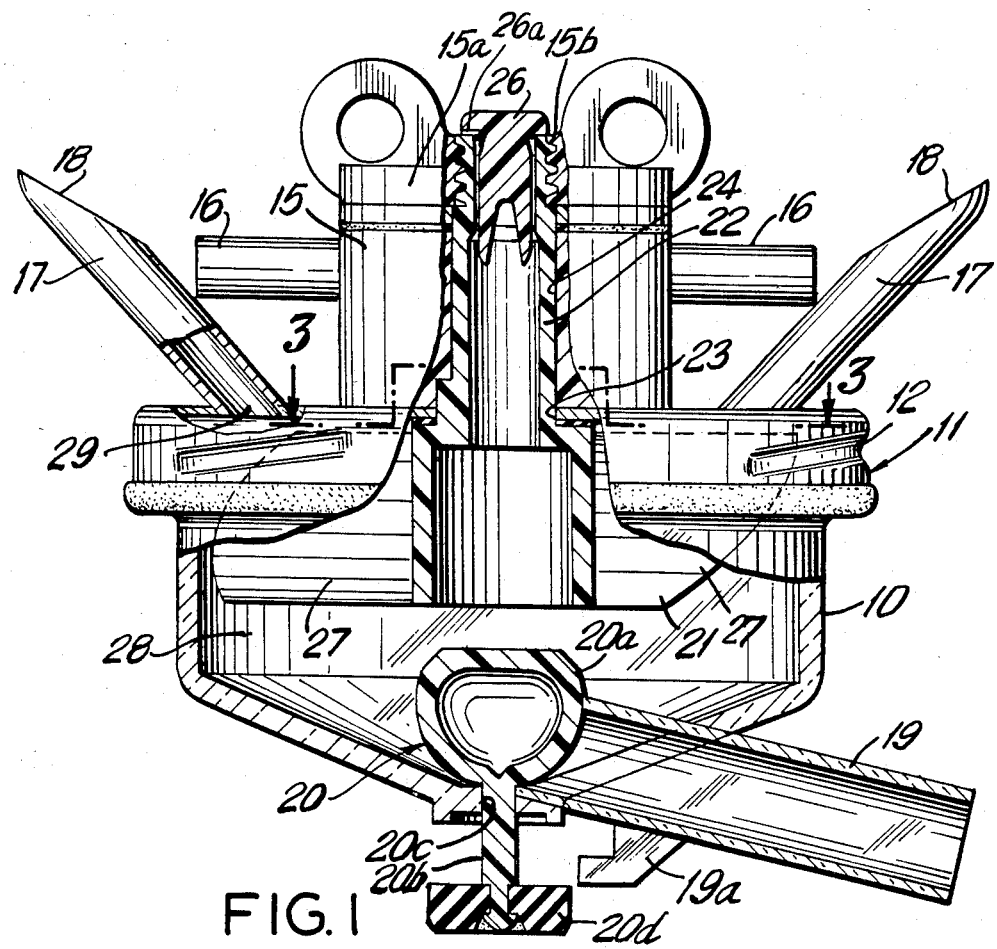
FIG. 1 is a view in side elevation and partly vertical section of a milk claw according to the invention.

Referring to FIG. 1, a milk claw according to the invention comprises a bowl 10 having a cover 11 which is attached to the bowl by any convenient means, for example, by means of inwardly pressed tapered flanges 12 which slide under flanges (not shown) on the top of the bowl.

On top of the cover 11 is mounted a turret 15 having nipples 16 for receiving tubes or hoses from a vacuum pulsating system and transmitting the pulsations to the outside of the teat cups. Details of the pulsation system are not part of the present invention.

An arm 9 is attached to the cover 11 for supporting the claw during use.

Figure 2:
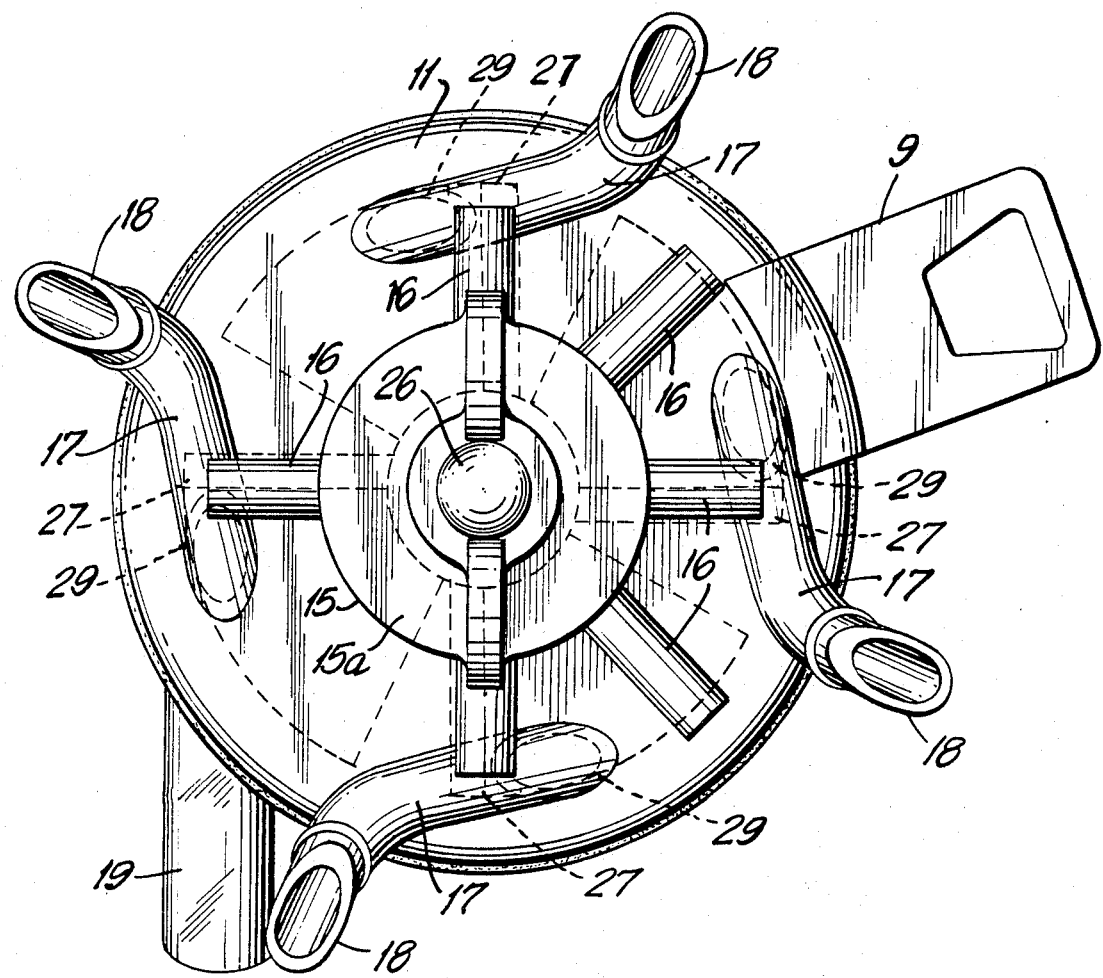
FIG. 2 is a plan view of a milk claw according to the invention.

As shown more clearly in FIG. 2, cover 11 has four nipples 17 to which may be connected tubes (not shown) leading to the interior of teat cups (not shown). Milk from the teat cups is delivered through the nipples 17 to the upper part of the milk claw. As shown in FIGS. 1 and 2, the nipples 17 preferably penetrate the cover 11 in a tangential direction to give the milk flow in the claw a swirling pattern. However, the nipples 17 are curved so that the axes of their outer ends 18 are approximately radial with respect to the bowl. This avoids unnecessary bending and cracking of the tubes or hoses which connect the nipples to the teat cups.

Figure 1A:
FIG. 1A is a plan view of the collar of the outlet valve of the milk claw of FIG. 1.

At the bottom of the bowl 10 is provided an outlet 19 through which milk may be delivered from the claw to a milk line (not shown). In the embodiment shown the outlet is located tangentially with respect to the bowl 10, although in some instances a radial outlet may be preferred. A valve 20 is provided for closing the outlet 19. The valve 20 consists of a ball 20a which is seated at entrance to outlet 19, and a shaft 20b which is loosely fitted in an aperture 20c in the bottom of the bowl, terminating in a collar 20d. The collar 20d as shown in FIG. 1A has ears 20e enabling it to be rotated and locked in arm 19a subtended from outlet 19 thus securing valve 20 in an open position. As long as vacuum is maintained in the bowl 10, valve 20 is raised from its seat by air pressure and opens the outlet to permit flow of milk therefrom. Should the vacuum fail, the valve 20 closes and prevents delivery of milk from the claw to the milk line. This is a conventional arrangement in milk claws.

Figure 3:
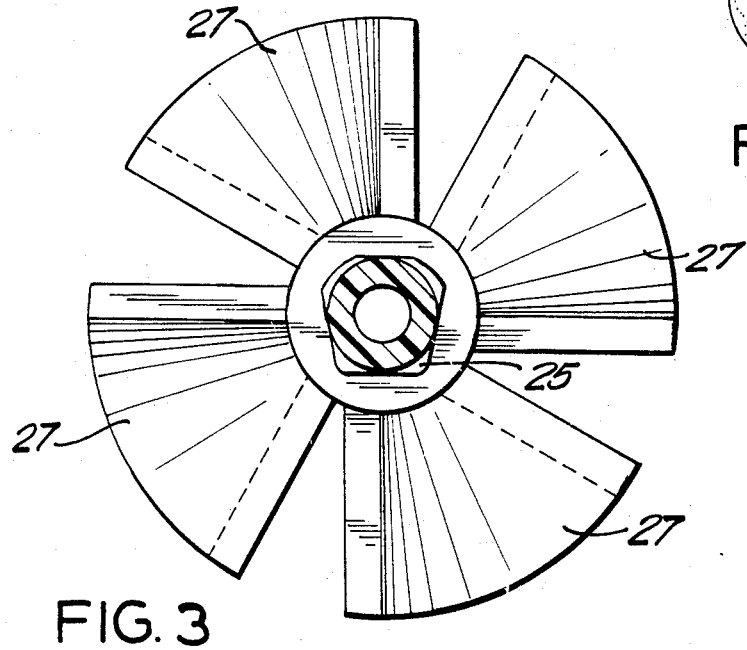
FIG. 3 is a plan view of the flow separator in the milk claw of FIGS. 1 and 2.

In accordance with the invention a flow separator 21 is provided in the upper part of the bowl 10. As will appear from FIGS. 1 and 3, the flow separator comprises a central shaft 22, which fits through an aperture 23 in the cover 11 and through a bore 24 which runs through the center of turret 15. The turret 15 has a removable upper section 15a into which the shaft 22 is threaded as at 15b. The shaft 22 has a trapezoidal shaped collar 25 which matches the shape of aperture 23 in the cover 11 to insure proper positioning of the flow separator in the bowl 10. A valve block 26 is sealed in the upper end of shaft 22. This is normally closed when vacuum is maintained in the claw; however, a a small hole 26a is provided for providing a limited but continuous supply of air.

The flow separator 21 is provided with four vanes or partitions 27 which extend downwardly in the bowl 11 but terminate well above the bottom of the bowl to leave a space 28 unobstructed. The vanes 27 are oriented by the collar 25 so that the outlets 29 of the nipples 17 each lie between two vanes. The vanes are preferably given a helical configuration so that milk delivered tangentially from the outlet is maintained in its spiral swirling flow pattern. The vanes of the flow separator thus maintain the milk from each teat cup and hence from each quarter of the animals' udder separate from milk drawn from the other quarters in the upper portion of the milk claw, suppressing cross flow from one teat cup to the other. At the same time, because each of the streams entering the claw has access to the unobstructed region at the bottom of the claw, variations in the vacuum, which would be occasioned by periods of flow and non-flow from individual teat cups, are leveled and wide swings of vacuum are avoided.

Although the invention has been described with reference to an embodiment in which the milk bearing nipples leading from the inner part of the teat cups enter the claw tangentially, it will be obvious that radial entry may be used. Also, in some instances a radial, rather than a tangential outlet may be preferred. Similarly, the vanes of the flow separator need not be given a helical configuration. Other possible variations in the design of the claw will be apparent to those skilled in the art.

What is claimed is:

1. Milk claw comprising a bowl having a top and a bottom, a plurality of inlet means for delivering streams of milk from a lactating animal tangentially to the top of said bowl, an outlet for receiving milk from the bottom of said bowl and a plurality of helically shaped vanes extending from the top of said bowl downwardly toward said bottom but terminating above said bottom to leave said bottom unobstructed, said vanes being spaced from one another to separate the milk streams delivered from each of said inlet means from milk delivered from other inlet means in the upper part of said bowl, thereby suppressing cross-contamination of said milk streams but permitting free communication between said streams in the bottom of the bowl.

2. The claim claimed in claim 1 wherein the inlet means comprise nipples having their outer ends radially oriented with respect to the bowl.

* * * * *